Aug. 25, 1959  L. ROBINSON  2,901,081
TYPEWRITER
Filed Sept. 10, 1956
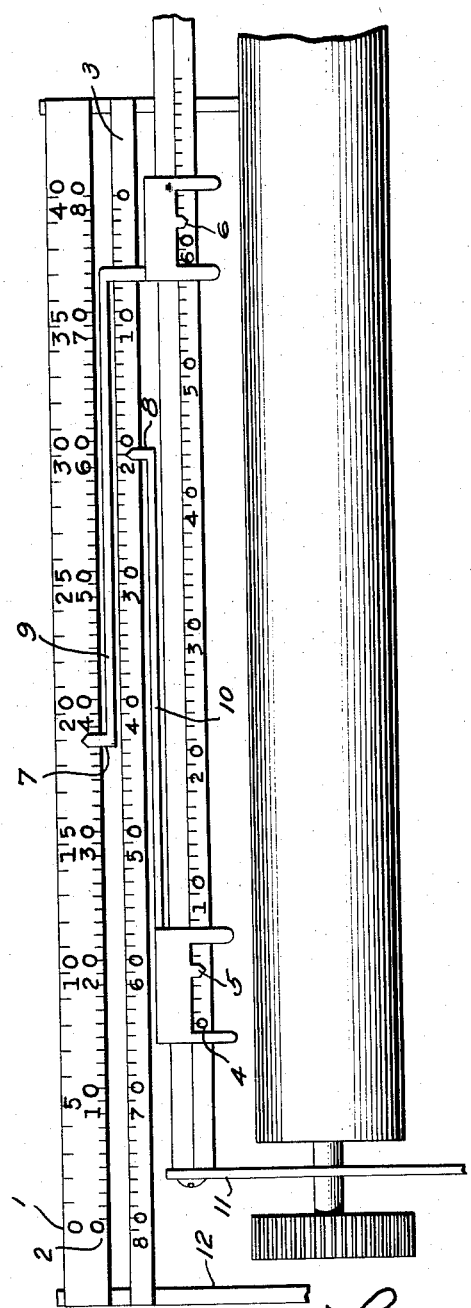
INVENTOR
Lawrence Robinson _United States Patent Office_

2,901,081
Patented Aug. 25, 1959

2,901,081

TYPEWRITER

Lawrence Robinson, Walla Walla, Wash.

Application September 10, 1956, Serial No. 609,038

21 Claims. (Cl. 197—194)

This is a type-line scale for use on typewriting machines which have methods of changing their line-length. Ordinary typewriters have fixed type-line scales, on the carriage or frame, which are not adjustable but remain in one position relative to the part to which they are attached, cooperating with a printing-point index on an opposite section of the machine which designates the position of the printing-point from the margins of a type-line. The margin-stops controlling the positions of these margins are adjustable endwise, so that the printing-point index is opposite the zero end of a scale only when the carriage is placed at the limit which the machine can write in either direction. Adjustment of the margin-stops causes the indexes on them to point to graduation marks on the scales which are a certain number of spaces from the scale beinnings or ends. Therefore it requires calculation to find the location of a character or space from a margin and this device is intended to eliminate it by causing the index for the printing-point to be at a scale beginning when it is opposite a margin-stop at the start or end of a line.

Standard typewriters have but one printing-point index and two are employed in this device, in order to show the carriage position from both margins, on fixed scales, by moving the indexes simultaneously with adjustable margin-stops or gauges. These index-bearing devices lie in slightly different planes, so as not to interfere with their endwise adjustment.

Rigid index-bearing devices are used as they have no moving parts and do not extend longitudinally beyond the combined width of the frame and length of the carriage, when the carriage-stop is between the margin-stops, or when it is outside of the stops, except when the margin-stop to which the printing-point index is attached is set more than half the full scale length from its normal position.

Two rigid extensions, one-half the length of the scales, with their lengths parallel to the direction of the carriage movement, are attached to adjustable margin-stops or gauges at one end, with printing-point indexes at their opposite ends; the said indexes pointing to fixed scales adjacent thereto, which change positions relative to them, longitudinally, during the operation of the machine. These indexes indicate on the scales the position of the printing-point from the adjusted margins, the index connected to the margin-stop controlling the line beginning being opposite the zero end of a scale at the starting margin for a line and the index controlling the line ending being opposite the zero end margin of a scale at the end of a line, in any adjusted positions of the stops.

Scales with alternate graduations, which are numbered in series in this drawing, permit the center of the space between margins to be located instantly.

An object of this invention is to provide a typewriter scale-reading device whose indexes are placed at the zero ends of fixed scales on the machine, at the margins for all line beginnings and endings, and indicate directly the number of spaces of the printing-point from either margin for a type-line, in any position of the carriage.

Another object is to permit the use of a scale-reading device without moving parts.

An object is to permit the printing-point indexes to be set automatically with adjustable margin-stops or margin-gauges.

Numbers 2 and 3 in the drawing are the usual fixed scales and 4 the margin adjusting scale, such as are used on ordinary typewriters; number 11 is the carriage and 12 the frame. Numbers 9 and 10 are extensions attached to margin-stops 5 and 6, with 7 and 8 indexes at their ends. Number 1 is a centering scale for finding the space center between margins, to aid in centering head-lines.

In the drawing, the margin-stop indexes are set at graduation marks 4 and 62, showing a line length between margins of 58 spaces. An additional scale, starting with zero at the right end, with notations ascending toward the left, could be placed on the margin-stop rack, if desired, to indicate the number of spaces of the right margin-stop from the end typewriter line length limit, and another centering scale could be placed opposite and parallel to scale number 3.

Index number 7, connected to the end margin-stop, points to graduation mark 38 on scale 2 and index number 8 points to 20 on scale 3, indicating that the printing-point has moved twenty spaces from the beginning margin and has 38 more spaces to go to reach the end margin. If the carriage were returned to the line beginning, index number 8 would point to zero on scale 3 and index number 7 would point to 58 on scale 2 or to 29 on scale 1, showing 29 as the center of the space between margins.

This invention can be applied either to a typewriter with margin-stops on the frame or with margin-stops on the carriage and portions of the improvement may be used without others.

I claim:

1. In a typewriter, the combination of margin-stops, a frame, a carriage traveling between the limits of said stops on the frame, type-line scales, printing-point index-bearing devices lying parallel to the direction of the carriage movement connected to said margin-stops, and pointers on the margin-stops and index-bearing devices to indicate the positions of the margin-stops and carriage upon the scales, a printing-point index-bearing device being shiftable with each of said margin-stops.

2. In a typewriter, the combination with movable margin-stops, of two parallel, stationary, full-length scales, each consisting of a series of numbered graduations, the space between numbers on one scale being twice that between the same numbers on the other scale and of a centering device, movable with one of said margin-stops and provided with a printing-point index.

3. In a typewriting machine, the combination with a scale and an index-bearing device, of a shiftable margin-stop, and means connecting said index-bearing device to said margin-stop so that an index on said device is always one-half of the full length of said scale.

4. In a typewriter, the combination with shiftable margin-stops with pointers, a carriage traveling between said stops and two line-scales; of two index-bearing devices with indexes, one connected to each of said margin-stops and shiftable therewith, said pointers and indexes indicating directly on the scales the position of the stops and carriage.

5. In a typewriter, the combination with a typewriter carriage, of shiftable margin-stops; type-line scales, rigid rods attached at an end to said stops parallel to the direction of the carriage movement; and printing-point indexes on the other ends of said rods and at right-angles to same, indicating directly on the scales the number of spaces of the printing-point from said margin-stops.

6. In a typewriter, the combination with shiftable margin-stops and a carriage traveling between said stops, of line-scales having graduations numbered in series from opposite ends, index-bearing devices in the form of rods set parallel to the direction of the carriage movement and attached at one end to a stop, one rod being movable with each margin-stop, and pointers on the stops and on the free ends of the rods, indicating on the scales the positions of the stops and carriage.

7. In a typewriter, the combination of type-line scales, adjustable margin-stops, a carriage limited in its travel in opposite directions by said margin-stops; two index-bearing devices; and pointers on said margin-stops and index-bearing devices, to indicate the positions of the margin-stops and carriage on the scales, when the stops are adjusted, in order to show the number of letter-spaces between said stops and the central space between said stops.

8. The combination of a typewriter frame and carriage with a common printing-point, of a main scale and an auxiliary scale, with notations ascending in the same direction and consisting of a series of numbered graduations, a margin-gauge for the line beginning and one for the line ending, a printing-point index-bearing device connected to one of said gauges, extending in the direction of the other gauge, the gauges being independently adjustable along the scales, the printing-point index on the device indicating on the main scale the number of letter-spaces between margin-stops, when the position of the carriage places the printing-point index opposite the graduation-mark indicating the line length on the scale; the space between numbers on the auxiliary scale being twice that between the same numbers on the main scale, to indicate the center of the line extending between said gauges.

9. The combination of a typewriter carriage, a right-hand margin-gauge, and frame, line-scales, a printing-point index adjustable endwise, a left-hand margin-gauge connected to said index for adjustment therewith, and a second printing-point index adjustable endwise, independently of the first, with the right-hand margin-gauge connected to it for adjustment therewith.

10. The combination, with a typewriter frame and carriage, of two line-scales having graduations numbered in series from opposite ends and an auxiliary scale, parallel to said scales, with notations on said auxiliary scale ascending in the same direction as one of the line scales, a margin-gauge for the line beginning and one for the end of the line and two printing-point index-bearing devices, each connected to one of said gauges, and extending in the direction of the other gauge, the gauges being adjustable along the scales, and a printing-point index on each device indicating on the scales the number of letter-spaces between margin-gauges, when the carriage is placed against either gauge; the space between numbers on the auxiliary scale being twice that between the same numbers on the said one of the line scales, to indicate the center of the line extending between said gauges on the auxiliary scale.

11. The combination with a typewriter having a frame and carriage, of an adjustable printing-point index and scale therefor, the range of adjustment of said index, from the position in which it registers the full carriage movement, being in the direction of the descending notation on the scale to vary the length of the scale-indicated line of writing for the printing-point; and a margin-gauge adjustable with said index.

12. The combination, with a typewriter having a frame and carriage, of two parallel linear scales, with notations starting from zero at opposite ends, and two adjustable printing-point indexes therefor, the range of adjustment for each of said indexes, from the position in which it registers the full carriage movement, being in the direction of the descending notation on a different one of said scales, to vary the length of the scale-indicated line of writing for the printing-point and a margin-gauge adjustable over the scales with each of said indexes.

13. In a typewriting machine, the combination with a carriage and a margin-gauge mechanism therefor, inclusive of two type-line scales, an adjustable stop to control the left-hand margin on a work-sheet and a second stop to control the right-hand margin on the work-sheet, of an index-bearing device attached to the first-named margin-stop and another index-bearing device attached to the last-named stop, said scales having graduations arranged to read directly the number of letter-spaces between said stops, and to indicate the length of writing line bounded by said indexes when the carriage is in either of its marginal positions.

14. In a typewriting machine, the combination with a carriage and a margin-gauge mechanism therefor, inclusive of an adjustable margin-stop to control the left-hand margin on a worksheet and a second adjustable stop to control the right-hand margin on the work-sheet, of an index-bearing device attached to the first-named stop and one also to the last-named stop, two type-line scales having graduations arranged to read directly the number of letter-spaces between said stops, when the carriage is in either of its marginal positions to indicate the length of writing-line bounded by said stops, and another scale having notations arranged to read directly the central-letter-space between margin-stops.

15. The combination with a typewriter frame and carriage, of a type-line scale, with graduations numbered in series consecutively, and an auxiliary scale having notated graduations at double the intervals of those on said type-line scale, the numbers on the auxiliary scale running in the same direction as those upon the main scale, a line-ending gauge, a line-beginning gauge, and an index for said scales, said index being attached to the line-ending gauge and both adjustable endwise in the direction of the run of the carriage and the line-beginning gauge adjustable independently of said index.

16. The combination with a typewriter frame and carriage, of a line-scale, an endwise adjustable index-bearing device and a gauge to determine the beginning of a line, said gauge connected to and adjustable with said device, whereby the width of the left-hand margin is controlled by the operator, and all line-lengths regulated by the gauge begin with the index opposite the zero on the scale.

17. The combination with a typewriter frame and carriage, of a line-scale, an endwise adjustable index-bearing device and a gauge to determine the ending for a line, said gauge connected to and adjustable with said device, whereby the width of the right-hand margin is controlled by the operator, and the end limit for all line-lengths controlled by the gauge is with the index at zero on the scale.

18. In a typewriter machine having a letter-feeding carriage the combination with a scale and an endwise adjustable index-bearing device with printing-point index therefor, of margin-gauge mechanism, including a stop connected to said device for adjustment therewith, to position said device end-wise, said stop variably and mechanically limiting the carriage movement, and the scale always presenting its "0" or initial notation to said index at the beginning of all line-lengths determined by the adjustment of said stop.

19. In a typewriting machine having a letter-feeding carriage the combination with a scale and an endwise adjustable index-bearing device therefor with index, of margin-gauge mechanism, including a stop connected to said device for adjustment therewith, to position said device endwise, the stop variably and mechanically limiting the carriage movement, and the scale always presenting its "0" or initial notation to said index at the end limit for all lines determined by the adjustment of said stop, and means cooperative with said device for mechanically indicating the center of each line whose length is determined by the adjustment of said stop.

20. In a typewriting machine having a frame and carriage, a combination of adjustable margin-stops on said carriage, of two fixed line-scales on said frame, parallel to the direction of the carriage movement, having graduations with notations beginning with zero at opposite ends, numbered in series, and two adjustable printing-point index-bearing devices on the carriage, each connected to a separate margin-stop and adjustable endwise with it, with pointers on said margin-stops to indicate their positions from the ends of the scales, on the frame, showing the type-line limits, the printing-point indexes denoting the direct number of spaces of each margin-stop from the printing-point in any position of the carriage between margin-stops.

21. In a typewriter having a frame and carriage, a first main line-scale on said frame whose length is parallel to the carriage movement with numbered graduations thereon in ascending order, a second main line-scale on said frame whose length is parallel to the carriage movement with numbered graduations thereon in reverse order of those on said first line-scale, an auxiliary scale parallel and adjacent to said main line-scales and having one-half the number of graduations of said main line-scales spaced at an interval double that of those on said main line-scales, a first index-bearing device having an index thereon, a second index-bearing device having an index thereon, a first margin-stop having said first index-bearing device attached thereto, and a second margin-stop having said second index-bearing device attached thereto, said first index indicating on said first main line-scale the number of graduations between said margin-stops when the carriage is in its line beginning position and indicating the central graduation between said margin-stops on said auxiliary scale, said second main line-scale indicating the number of graduations between said margin-stops when the carriage is in the line-ending position.

References Cited in the file of this patent

UNITED STATES PATENTS

| | | |
|---|---|---|
| 1,153,252 | Pritzl | Sept. 14, 1915 |
| 1,690,848 | Barker | Nov. 6, 1928 |